(12) United States Patent
Rickett et al.

(10) Patent No.: US 9,702,994 B2
(45) Date of Patent: Jul. 11, 2017

(54) WAVEFORM INVERSION BY MULTIPLE SHOT-ENCODING FOR NON-FIXED SPREAD GEOMETRIES

(75) Inventors: James E. Rickett, Cambridge (GB); Paul N. Childs, Cambridge (GB)

(73) Assignee: WESTERNGECO L.L.C., Houston, TX (US)

( * ) Notice: Subject to any disclaimer, the term of this patent is extended or adjusted under 35 U.S.C. 154(b) by 778 days.

(21) Appl. No.: 13/371,190

(22) Filed: Feb. 10, 2012

(65) Prior Publication Data

US 2012/0215506 A1 Aug. 23, 2012

Related U.S. Application Data

(60) Provisional application No. 61/463,575, filed on Feb. 18, 2011.

(51) Int. Cl.
*G06G 7/48* (2006.01)
*G01V 1/28* (2006.01)

(52) U.S. Cl.
CPC .......... *G01V 1/282* (2013.01); *G01V 2210/21* (2013.01); *G01V 2210/24* (2013.01); *G01V 2210/614* (2013.01)

(58) Field of Classification Search
CPC .......... G01V 1/00; G01V 1/003; G01V 1/005; G01V 1/006; G01V 1/16; G01V 1/22; G01V 1/28; G01V 1/282; G01V 11/00; E21B 49/00; E21B 43/00; G06F 2217/16; G06F 17/5018
USPC ......................................................... 703/10
See application file for complete search history.

(56) References Cited

U.S. PATENT DOCUMENTS

| | | | |
|---|---|---|---|
| 4,707,812 A | 11/1987 | Martinez | |
| 5,924,049 A | 7/1999 | Beasley et al. | |
| 7,916,576 B2 | 3/2011 | Beasley et al. | |
| 8,395,966 B2 | 3/2013 | Moore et al. | |
| 2006/0136162 A1 | 6/2006 | Hamman et al. | |
| 2008/0195319 A1* | 8/2008 | Wilkinson | E21B 49/00 702/6 |
| 2009/0006054 A1 | 1/2009 | Song | |
| 2009/0168600 A1 | 7/2009 | Moore et al. | |
| 2009/0326895 A1 | 12/2009 | Beasley | |

(Continued)

OTHER PUBLICATIONS

Simultaneous source separation: a prediction-subtraction approach, Simon Spitz, SEG Las Vegas 2008.*

(Continued)

*Primary Examiner* — Saif Alhija
(74) *Attorney, Agent, or Firm* — Gary Gex

(57) ABSTRACT

Seismic data processing methods and computing systems are presented. In one embodiment, a method is disclosed that includes simulating a set of simulated seismic data from a set of acquired seismic data; separating the simulated seismic data into a plurality of data sets, wherein one set of data is matched in the acquired seismic data and one set of data is unmatched in the acquired seismic data; conforming the simulated seismic data and the acquired seismic data to one another using separated, simulated seismic data unmatched by a counterpart in the acquired seismic data from the acquired seismic data; and performing an inversion between the acquired seismic data and the separated, simulated seismic data after they are conformed to one another.

23 Claims, 7 Drawing Sheets

(56) References Cited

U.S. PATENT DOCUMENTS

| | | |
|---|---|---|
| 2010/0018718 A1 | 1/2010 | Krebs et al. |
| 2010/0085836 A1 | 4/2010 | Bagaini et al. |
| 2010/0097885 A1 | 4/2010 | Moore |
| 2010/0097888 A1 | 4/2010 | Neelamani et al. |

OTHER PUBLICATIONS

International Search Report and Written Opinion of PCT Application No. PCT/US2012/024854 dated Nov. 1, 2012: pp. 1-8.

Akerberg, et al., "Simultaneous Source Separation by Sparse Radon Transform", SEG Annual Meeting, Las Vegas, Nevada, 2008, 5 pages.

Beasley, et al., "A New Look at Simultaneous Sources", SEG Annual Meeting, New Orleans, Louisiana, 1998, 3 pages.

Ben-Hadj-Ali, et al., "Three-dimensional Frequency-domain Full Waveform Inversion With Phase Encoding", SEG Annual Meeting, Houston, Texas, 2009, 5 pages.

Capdeville, et al., "Towards global earth tomography using the spectral element method: a technique based on source stacking", Geophysical Journal International, vol. 162 (2), 2005, pp. 541-554.

Herrmann, F.J., "Randomized Dimensionality Reduction for Full-waveform Inversion", 72nd EAGE Conference & Exhibition, 2010, 5 pages.

Krebs, et al., "Fast full-wavefield seismic inversion using encoded sources", Geophysics, vol. 74 (6), 2009, pp. WCC177-WCC188.

Moore, et al., "Simultaneous Source Separation using Dithered Sources", SEG Annual Meeting, 2008, pp. 2806-2810.

Romero, et al., "Phase encoding of shot records in prestack migration", Geophysics, vol. 65 (2), 2000, pp. 426-436.

Spitz, et al., "Simultaneous Source Separation: a Prediction-subtraction Approach", SEG Annual Meeting, Las Vegas, Nevada, 2008, 5 pages.

Vigh, et al., "3D prestack plane-wave, full-waveform inversion", Geophysics, vol. 73 (5), 2008, pp. VE135-VE144.

International Preliminary Report on Patentability of PCT Application No. PCT/US2012/024854 dated Aug. 29, 2013: 5 pages.

* cited by examiner

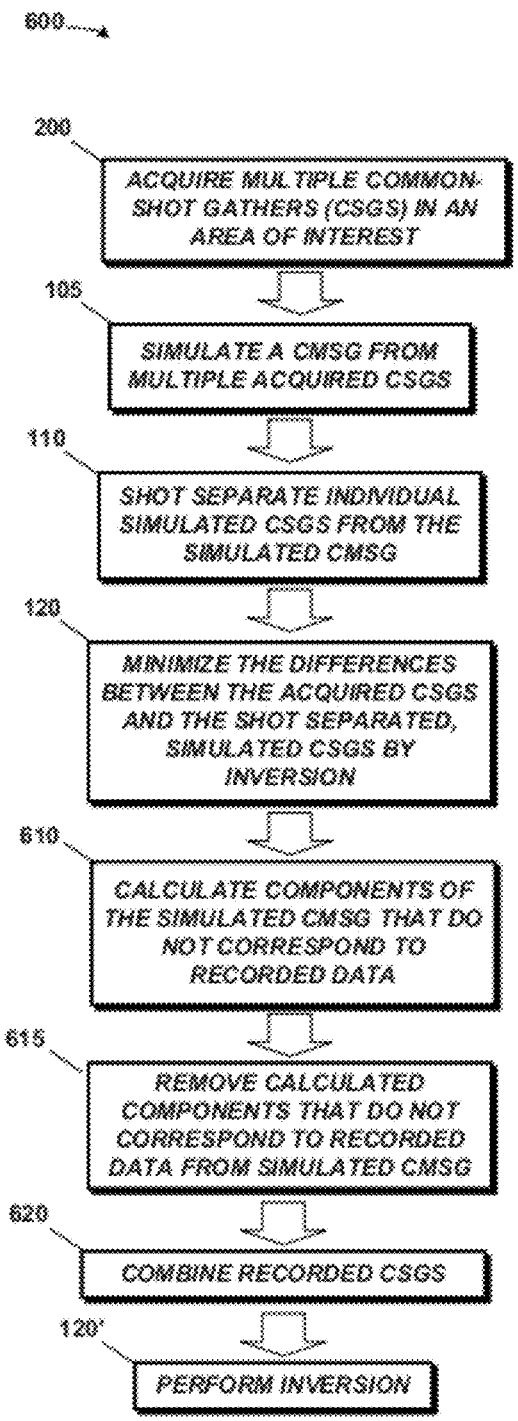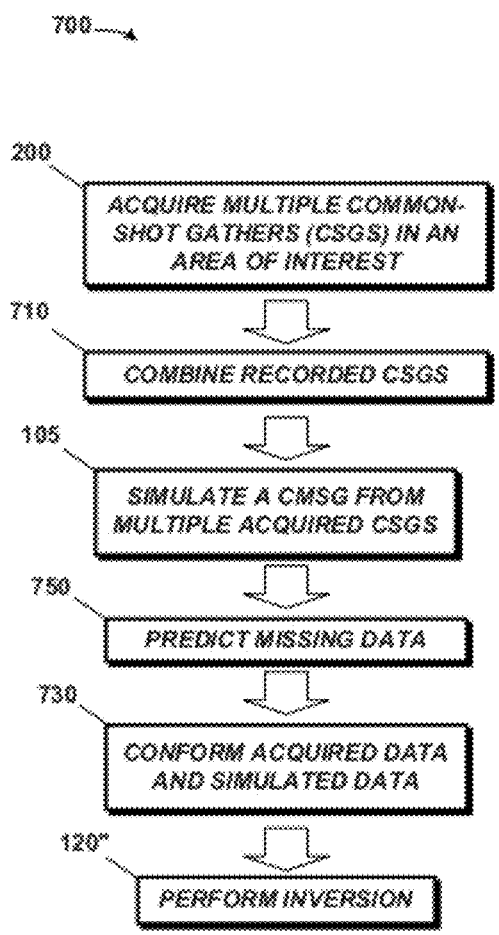
FIG. 6A
FIG. 7A

WAVEFORM INVERSION BY MULTIPLE SHOT-ENCODING FOR NON-FIXED SPREAD GEOMETRIES

This application claims benefit of U.S. Provisional Patent Application Ser. No. 61/463,575 filed Feb. 18, 2011, and is hereby incorporated by reference herein in its entirety.

TECHNICAL FIELD

The disclosed embodiments relate generally to data processing, and more particularly, to processing of data collected in varying contexts, including, but not limited to non-fixed spread seismic surveying. This includes towed-array, marine seismic surveying, but also other non-fixed spread seismic surveying techniques, such as rolling spread seismic surveying acquired in land environments.

DISCUSSION OF RELATED ART

This section of this document is intended to introduce various aspects of the art that may be related to various aspects of the technique described and/or claimed below. This section provides background information to facilitate a better understanding of the various aspects of the presently disclosed technique. As the section's title implies, this is a discussion of related art. That such art is related in no way implies that it is also prior art. The related art may or may not be prior art or analogous prior art. It should therefore be understood that the statements in this section of this document are to be read in this light, and not as admissions of prior art.

Seismic exploration involves surveying subterranean geological formations for hydrocarbon deposits. A survey typically involves deploying seismic source(s) and seismic sensors at predetermined locations. The sources impart acoustic waves having frequencies suitable to seismic prospecting—i.e., "seismic signals"—into the geological formations. Features of the geological formation reflect the acoustic waves to the sensors. The sensors receive the reflected waves, which are detected, conditioned and processed to generate seismic survey data. Analysis of the seismic survey data can then indicate the presence or absence of probable locations of hydrocarbon deposits.

Seismic surveys are sometimes referred to by the environment in which they are conducted. Some surveys are known as "marine" surveys because they are conducted in marine environments. Note that marine surveys may be conducted not only in saltwater environments, but also in fresh and brackish waters. One type of marine seismic survey is known as a "towed array" survey. In such a survey, an array of seismic cables (known as "streamers") and seismic sources is towed behind one or more survey vessels. Some surveys are known as "land" or "land-based" surveys because they occur on land. That is, both the sources and receivers are positioned on land during the survey. Still other kinds of surveys are known as "transition zone" surveys because they occur in the transition between land and water, or in swampy areas.

Those skilled in the art also sometimes refer to seismic surveys by certain characteristics they possess. For example, some seismic surveys are referred to as "fixed spread" surveys because their sources and receivers are located at "fixed" positions during the survey. Some are referred to as "non-fixed spread" surveys. These surveys employ seismic acquisition geometries in which the active receiver locations varies for different shots. A classic example of such a survey is the towed array survey discussed above. These surveys use non-fixed spreads in the source and receiver positions change as the survey vessel tows them through the water. In some land surveys, spreads are non-fixed because it is efficient for the crew to continually move the receiver spread as the data is being acquired.

Full-waveform inversion ("FWI") is an approach to seismic velocity model building that minimizes the misfit between observed data and predicted data. Since the misfit is sensitive to both the amplitude and phase of the observed data, FWI has the potential to deliver velocity models with higher resolution than conventional models. Furthermore, the power of modern optimization techniques means FWI has the potential to work with minimal user input. This has significant advantages over conventional velocity model building practices in complex areas such as salt provinces, which involve manually intensive workflows. Advances in computational power and algorithmic efficiency mean it is becoming practical to invert 3D prestack seismic survey data. Consequently, full-waveform inversion (FWI) is rapidly gaining attention as a practical method for estimating seismic velocities in complex geological areas.

There are many flavors of full-waveform inversion; however, the shared premise that separates FWI from other wave-equation velocity updating schemes is that FWI techniques are based on minimizing a misfit, E, between observed data, d, and predicted data with respect to the earth model, m. More generally, FWI is based on minimizing a norm (or metric) of the misfit between observed and predicted data, or equivalently maximizing a measure of similarity between observed and predicted data.

The modeling and data-matching can be done either in the time-domain, in the frequency domain, or even a combination of the two. The modeling kernels vary in architecture, and can include two-way wave propagation, one-way extrapolators, or other approaches. There are pros and cons to the various approaches. In any domain, however, this is a nonlinear optimization problem that must be solved iteratively.

At each iteration, the usual procedure involves starting from an initial earth model, forward modeling sonic simulated data, differencing the simulated and observed wavefields to produce a residual, and the back-projecting of the residual to produce a model update that can be used to update the earth model.

The straightforward approach involves modeling each shot separately to give a cost that is proportional to the total number of shots in the seismic survey. To reduce the computational cost, a number of techniques have been developed that allow some number of shots to be modeled, differenced and back-projected simultaneously. Some of these approaches combine shots by summation (shot-stacking), other approaches use more complicated combinations (e.g. phase encoding), which reduce correlations between the shots that are back-projected together.

These methods require shots to be "added together" so that they can be compared to simulated data generated with multiple simultaneous sources. In this context, traces can only be added together if the receiver locations were coincident. Simultaneous shot stacking methods are therefore suitable for seismic acquisition geometries in which receiver geometries (or shot geometries, in the reciprocal case) remain fixed while a number of shots are acquired. This is generally true for land acquisition and fixed-node marine methods such as ocean bottom cables ("OBC") and ocean bottom seismometers ("OBS"). However, for conventional marine-streamer acquisition, the receiver spread moves with each shot, and so shot stacking methods are not directly applicable. One approach to mitigating this is to only use traces in the inversion for which overlapping data is recorded. Unfortunately, this reduces the effective aperture of the survey.

The disclosed embodiments are directed to overcoming or reducing the effects of one or more of the problems set forth above.

SUMMARY

The technique disclosed herein, in its several aspects and embodiments, includes various computer-implemented methods for use in processing seismic data. In some embodiments, it includes a program storage medium encoded with instructions that, when executed by a computing device, performs such methods. It also includes in still other embodiments a computing apparatus programmed to perform such methods.

Thus, in a first embodiment, one such method includes simulating a set of simulated seismic data from a set of acquired seismic data; separating the simulated seismic data into a plurality of data sets; conforming the simulated seismic data and the acquired seismic data to one another using separated, simulated seismic data unmatched by a counterpart in the acquired seismic data from the acquired seismic data; and an inversion between the acquired seismic data and the separated, simulated seismic data after they are conformed to one another.

In various aspects thereof, the separation may be a shot separation.

In other aspects, separating the simulated seismic data includes predicting the data that is unmatched in the acquired seismic data. Predicting the data may include Plane wave modeling, f-x modeling, or Radon modeling. It may exploits incoherence of multiple shots in domains other than common shot. It may utilize information from geometry of the recorded data.

In another aspect, the separation is limited to separated, simulated seismic data unmatched by a counterpart in the acquired seismic data.

In another aspect, conforming the simulated seismic data and the acquired seismic data to one another includes eliminating separated, simulated seismic data unmatched by a counterpart in the acquired seismic data from the acquired seismic data.

In another aspect, the separated, simulated seismic data may include a recorded wavefield whose simulated data is matched by data in the acquired seismic data and a non-recorded wavefield whose simulated data is unmatched by data in the acquired seismic data; and eliminating the unmatched simulated seismic data includes muting the non-recorded wavefields.

In yet another aspect, eliminating the unmatched simulated seismic data may include: computing the missing wavefield in the separated, simulated seismic data; and removing the missing data of the missing wavefield from the simulated seismic data. The acquired data may comprise common shot gathers, and the method may further comprise combining the common shot gathers of the acquired data, wherein the inversion is performed between the combined acquired seismic data and the simulated seismic data from which the missing wavefield has been removed. The combination may include the same choice of shots as in the simulated data, or the same encoding as the simulated data, or local interpolation to colocate proximally recorded traces prior to combination, or flex-binning, or some combination thereof. The nature of their encoding in the joint simulation may be chosen to facilitate their separation. Local interpolation or flex-binning may also be performed prior to combination.

DESCRIPTION OF THE DRAWINGS

The technique will hereafter be described with reference to the accompanying drawings, wherein like reference numerals denote like elements, and:

FIG. 6A-FIG. 6B illustrate an approach to multisource FWI in which the modeled wavefields are separated into CSGs and the missing component of the wavefield is then subtracted from the multi-source gather before matching to the combined recorded CSG; and FIG. 7A-FIG. 7B illustrate an approach to multisource FWI in which missing component is predicted and removed from the modeled wavefield before matching to the combined recorded CSG.

Figure 1:
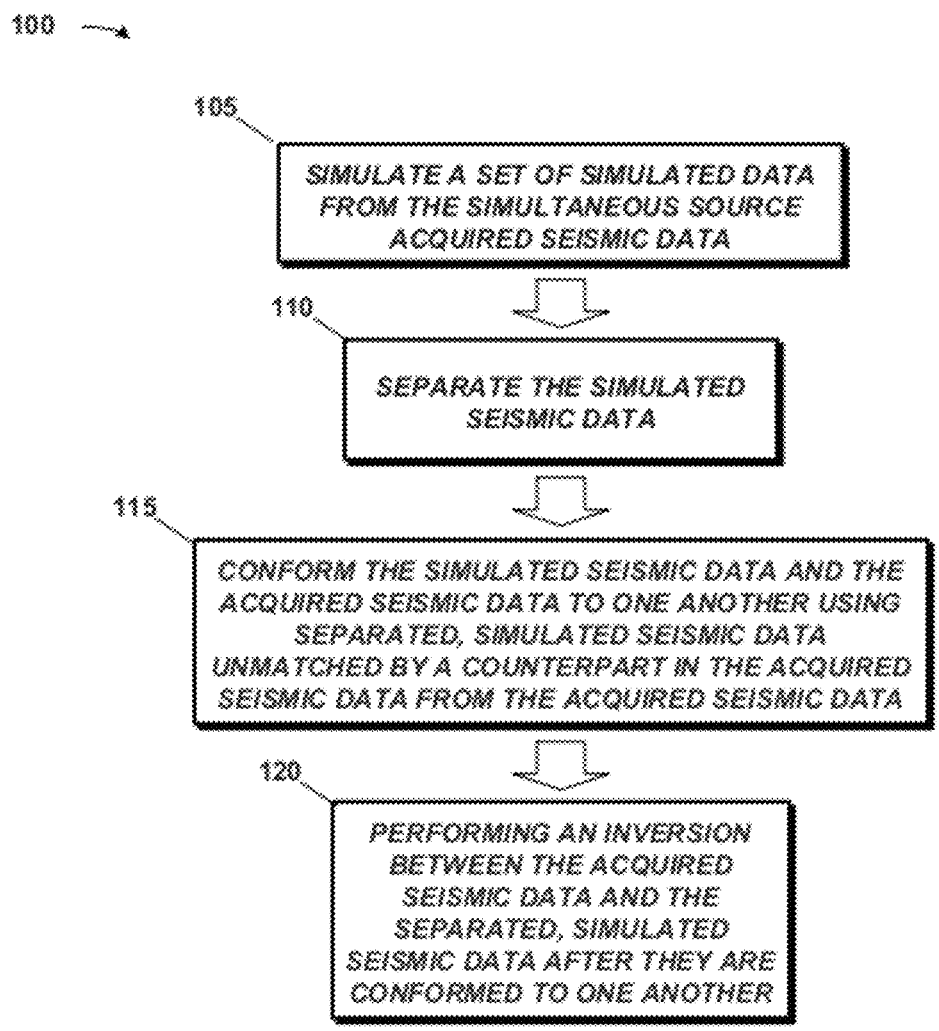
FIG. 1-FIG. 2 illustrate one particular embodiment of a method practiced in accordance with some embodiments.

While the presently disclosed technique is susceptible to various modifications and alternative forms, specific embodiments thereof have been shown by way of example in the drawings and are herein described in detail. It should be understood, however, that the description herein of specific embodiments is not intended to limit the presently disclosed technique to the particular forms disclosed, but on the contrary, the intention is to cover all modifications, equivalents and alternatives falling within the scope as defined by the appended claims.

DETAILED DESCRIPTION OF EMBODIMENTS

One or more specific embodiments will be described below. It is specifically intended that the presently disclosed technique not be limited to the embodiments and illustrations contained herein, but include modified forms of those embodiments including portions of the embodiments and combinations of elements of different embodiments as come within the scope of the following claims. It should be appreciated that in the development of any such actual implementation, as in any engineering or design project, numerous implementation-specific decisions must be made to achieve the developers' specific goals, such as compliance with system-related and business related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure. Nothing in this application is considered critical or essential unless explicitly indicated as being "critical" or "essential."

The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

Some embodiments of the presently disclosed techniques adapt multisource-separation techniques used for simultaneous source ("sim-source") acquisition to the waveform inversion application during processing of acquired seismic survey data. There are many variations in how this might be achieved. For example, separated sources can either be matched to recorded data directly, or the estimates of the unrecorded data made from the separated modeled shots can be used to simulate the combination of shot gathers in a marine geometry where some receiver locations are only occupied for some shots. An inversion is eventually performed to minimize the differences between the two sets of data.

Some embodiments of the presently disclosed techniques differ from convention practice in that all the acquired data can be included in the inversion, and mutes in the acquired data are not necessary. This is done by using shot-separation methods on the simulated multisource gathers. An important point here is that modeling of many shots can be done simultaneously. The assumption is that the modeling process is significantly more expensive than the separation.

Some embodiments process data previously acquired while others include the data acquisition itself. The former embodiments may therefore operate on data acquired by third parties not processing the data. They may also operate on seismic survey data whose acquisition is sufficiently removed in time from the processing that it may be regarded as what is known in the art as "legacy data." However, since the latter set of embodiments includes the data acquisition, a brief summary of such acquisition will also be presented.

Reference will now be made in detail to some of the various embodiments within the scope of this disclosure, examples of which are illustrated in the accompanying drawings. Various structures, systems and devices are schematically depicted in the drawings for purposes of explanation only and so as to not obscure the presently disclosed techniques with details that are well known to those skilled in the art. Nevertheless, the attached drawings are included to describe and explain illustrative, non-limiting examples.

Figure 2:
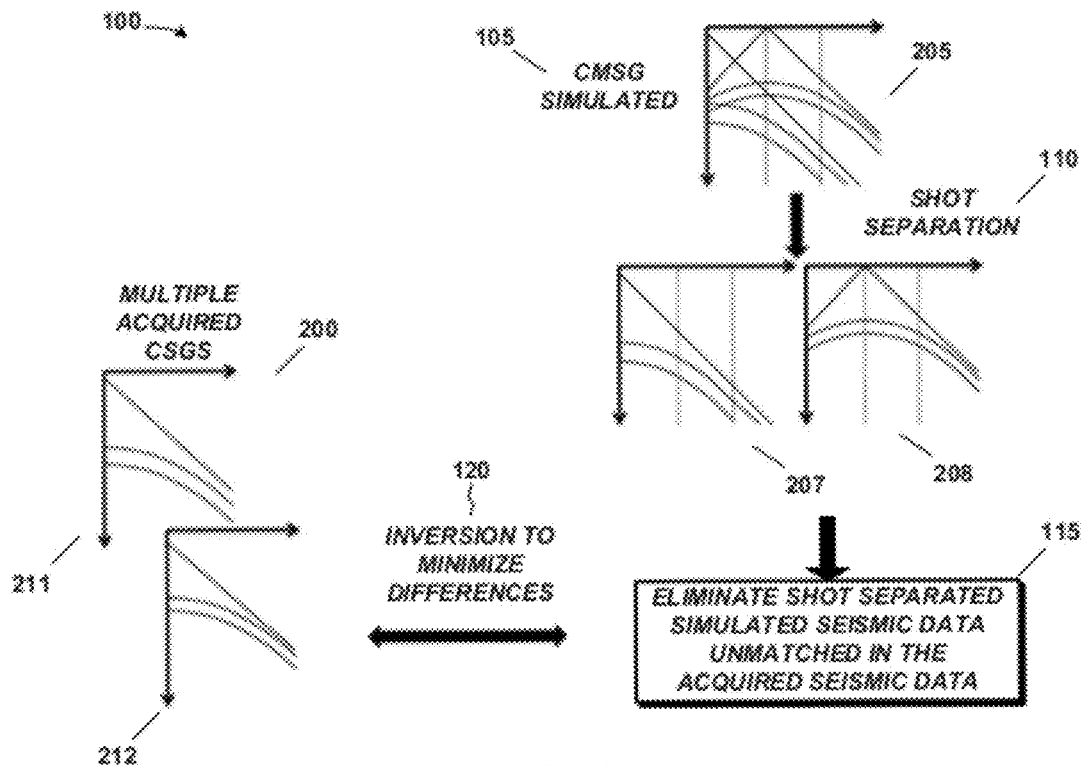
Figure 3:
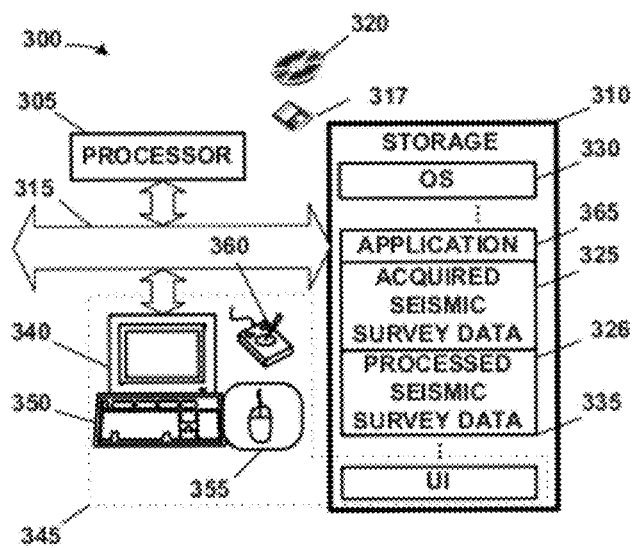
FIG. 3 depicts a computing apparatus on which one particular embodiment may be practiced.

Turning now to the drawings, one aspect of the presently disclosed techniques includes a computer-implemented method by which the acquired seismic survey data is processed as briefly described above. FIG. 1-FIG. 2 and FIG. 3 illustrate such a method 100 and a computing apparatus 300 on which it might be performed, respectively. More particularly, FIG. 1 and FIG. 2 illustrate an approach to multisource FWI in which the modeled wavefields are separated into CSGs and the separated CSGs are matched to the recorded data during inversion and will be addressed a bit further below. The method 100 in FIG. 1-FIG. 2 is computer-implemented method for use in processing seismic data acquired using simultaneous source acquisition techniques. A brief description of the computing apparatus 300 in FIG. 3 will therefore be presented first.

FIG. 3 shows selected portions of the hardware and software architecture of a computing apparatus 300 such as may be employed in some embodiments. The computing apparatus 300 includes a processor 305 that can access storage 310. In some embodiments, processor 305 accesses storage over bus system 315. In other embodiments, other computer architectures may be used so that one or more processors 305 can access storage 310. A user interacts with the computing apparatus 300 through a user interface 345. The processor 305, storage 310, and bus system 315 may be implemented in any suitable manner known to the art. However, those in the art will realize that seismic survey data is typically quite voluminous and that techniques such as the one disclosed herein are computationally intensive. The computing apparatus 300 should therefore be implemented accordingly—i.e., in a manner suitable for processing large amounts of data in computationally intensive techniques.

The storage 310 may include practically any type of program storage medium. It will typically include a hard disk and/or random access memory ("RAM") and may include removable storage such as a magnetic disk 317 and/or an optical disk 320. Typically, some portions of the memory that comprises the storage 310 will be read-only while others permit writes. In some embodiments, storage 310 may be distributed across multiple computing systems or computing apparatuses such as 300.

The storage 310 is encoded with previously acquired seismic survey data 325. The acquired seismic survey data 325 may be stored using any suitable data structure known to the art. The data structure will typically be, for example, a flat file or a text delimited file. However, acceptable alternatives include structures such as a database, a list, a tree, a table, etc. The presently disclosed technique is not limited by the manner in which the acquired seismic survey data 325 is stored. As is discussed further below, the seismic survey data 325 should have been acquired using simultaneous source techniques during survey. The period of time between acquisition and processing is not material to the practice of the technique. The seismic survey data 325 may therefore be freshly acquired or legacy data depending on the embodiment and provided that it was acquired using simultaneous source techniques.

The storage 310 is also encoded with an operating system 330, user interface software 335 and an application 365. The user interface software 335, in conjunction with a display 330 and peripheral I/O devices such as a keypad or keyboard 350, a mouse 355, or a joystick 360, implements the user interface 345. The processor 305 runs under the control of the operating system 330, which may be practically any operating system known to the art. The application 365, when invoked, performs the method of the presently disclosed technique, e.g., the method 100 of FIG. 1. The user may invoke the application in conventional fashion through the user interface 345. Although this particular embodiment performs the method 100 in an application, the nature of the software component in which this functionality resides is not material to the practice of the disclosed technique. The functionality may reside in other types of software components as, for example, a utility, a daemon, a thread, etc.

As those with skill in the art will appreciate, a plurality of computing apparatuses may be used to form a computing system or distributed computing system capable of performing the methods and techniques disclosed herein. The plurality of computing apparatuses may be in a server farm in one geographic location, or may be distributed across a number of sites in different locations.

Referring now to all of FIG. 1, FIG. 2 and FIG. 3, the method 100 is a computer-implemented method in accordance with some embodiments for performing a full-waveform inversion on simultaneous source ("sim-source") acquisition seismic survey data using adapted multisource-separation techniques. This particular embodiment presumes that the acquired seismic survey data 325 was previously acquired and is indifferent to whether such data is freshly acquired. The data may be single component (e.g., pressure only) or multi-component (e.g., pressure and particle motion) acquired from reflected acoustic signals at seismic frequencies. It may also be data characterized as one-dimensional ("1D"), two-dimensional ("2D"), three-dimensional ("3D"), or four-dimensional ("4D"). The acquisition may be single azimuth, multi-azimuth, rich (or full) azimuth, or wide azimuth in nature.

The embodiments illustrated herein acquire seismic survey data using sequential acquisition techniques that facilitate shot separation during processing. However, this is not required for all embodiments. Other, alternative embodiments may operate on simultaneously acquired datasets. One then models the sources simultaneously and all the modeled data will be able to match the acquired data. Problems may arise upon combining the separately acquired data and the receiver spreads do not overlap. In that case, the modeled data will have events that were not recorded on the separately acquired data. The presently disclosed techniques are not dependent on simultaneous source acquisition. Rather, some embodiments use simultaneous modeling to reduce modeling costs in inversion. This is performed by using separating shots in the simulated data borrowing the separation technology from the simultaneous acquisition techniques.

The acquired seismic survey data 325 includes what are known in the art as "common shot gathers" ("CSGs") 200, shown in FIG. 2. More technically, the acquired seismic survey data 325 can be sorted, processed, or pre-processed, to generate a set of common shot gathers, There are several techniques known to the art for doing this and any suitable technique may be employed, including those used in conventional practice of FWI.

The method 100 begins by simulating (at 105) a set of simulated seismic data from the acquired seismic data (e.g., a set of data that is based on the acquired seismic data is created via simulation; a set of simulated seismic data is simulated from the acquired seismic data, etc.). In some embodiments, the multiple, acquired CSGs are simulated (at 105) using a single run of a seismic modeling code (not shown) to produce a "common multisource gather" ("CMSG") 205. The shots in the common multisource gather may be chosen based on criteria to facilitate their separation, and they may be encoded with a known amplitude or time-series to facilitate their separation.

The method 100 then separates (at 110) the simulated seismic data. In the illustrated embodiment, this is a shot separation. In some embodiments, individual simulated CSGs are then separated (at 110) from the CMSG 205 to create to shot separated subsets 207, 208. Suitable shot separation techniques are known to the art, and any suitable technique may be used. The following non-limiting list of references, for example, disclose at least some suitable shot separation techniques:

U.S. Pat. No. 5,924,049, entitled "Methods for acquiring and processing seismic data," issued Jul. 13, 1999, to Western Atlas International, Inc. as assignee of the inventor Craig J. Beasley;

U.S. application Ser. No. 12/174,310, entitled "Optimizing a Seismic Survey for Source Separation," and filed Jul. 16, 2008, in the name of the inventors Craig J. Beasley et al.;

U.S. application Ser. No. 12/165,185, entitled "Technique and System for Seismic Source Separation," and filed Jun. 30, 2008, in the name of the inventor Craig J. Beasley;

U.S. application Ser. No. 11/964,402, entitled "Separating Seismic Signals Produced by Interfering Seismic Sources," and filed Dec. 26, 2007, in the name of the inventor Ian Moore et al.;

U.S. application Ser. No. 12/247,284, entitled "Dithered. Slip Sweep Vibroseis Acquisition System and Technique," and filed Oct. 8, 2008, in the name of the inventors Claudio Bagaini and Ian Moore;

U.S. application Ser. No. 12/256,135, entitled "Removing Seismic Interference Using Simultaneous or Near Simultaneous Source Separation," and filed Oct. 22, 2008, in the name of the inventor Ian Moore;

U.S. application Ser. No. 12/429,328, entitled "Separating Seismic Signals Produced by Interfering Seismic Sources," and filed Apr. 24, 2009, in the name of the inventors Ian Moore et al.;

Each of the above captioned applications is commonly assigned herewith. Additional information may be found in:

P. Akerberg et al., "Simultaneous Source Separation by Sparse Radon Transform," *SEG Expanded Abstracts* (2008);

C. J. Beasley et al., "A New Look at Simultaneous Sources," *SEG Expanded Abstracts* (1998);

I. Moore, "Simultaneous Source Separation Using Dithered Sources," *SEG Expanded Abstracts* (2008); and S. Spitz et al., 2008, "Simultaneous Source Separation: A Prediction-Subtraction Approach," *SEG Expanded Abstracts* (2008).

However, any suitable source separation technique may be employed.

The method 100 then conforms (at 115) the simulated seismic data and the acquired seismic data to one another using the separated, simulated seismic data unmatched in the acquired seismic data. As noted above, the presently disclosed techniques admit variation in how this might be performed. For example, separated sources can either be matched to recorded data directly, or the estimates of the unrecorded data made from the separated modeled shots can be used to simulate the combination of shot gathers in a marine geometry where some receiver locations are only occupied for some shots. Three such embodiments are discussed further below in relation to FIG. 5A-FIG. 5B, FIG. 6A-FIG. 6B and FIG. 7A-FIG. 7B.

The method 100 then performs (at 120) an inversion between the acquired seismic data and the separated, simulated seismic data after they are conformed to one another. In some embodiments, the differences between the simulated and acquired data CSGs are then minimized (at 120) by inversion. This inversion (at 120) can be performed using the same techniques as are used in conventional practice. However, the conventional practice is modified. In conventional practice, there is a single inversion between a simulated CMSG and a set of combined CSGs, both with non-overlapping data muted. In some embodiments of the presently disclosed techniques, the inversion is performed between individual shot-separated subsets 207, 208 and their respective CSGs 211, 212. In some embodiments, many CMSGs may be inverted simultaneously. The inversion is also an iterative procedure, so in some embodiments, the CMSG generation process (105-115) will be repeated at each iteration. The individual shots making up each CMSG may change at each iteration.

The effectiveness of some embodiments increases when source separation is performed well, as residual secondary source energy will appear as coherent noise in the gather that is inverted. This may put limit or reduce how many shots can be inverted simultaneously. However, the shot-encoding scheme can be changed at each iteration in the inversion process, and consequently the nature of this residual noise can also be changed at each iteration. Krebs et al. have shown in the documents referenced herein that iterative FWI performs well if the nature of the noise changes at each iteration.

FIG. 2, as well as FIG. 5B and FIG. 6B discussed below, illustrate how the residual misfit between observed and simulated data can be computed in an FWI scheme in accordance with some embodiments. For the inversion to proceed, the residual misfit should be projected back into the model space so a decent direction can be obtained. In practice this can be done a number of ways. For example, the simplest and most direct approach would involve back-projecting the residual using the adjoint of the multisource modeling code, ignoring the effects of the shot separations. A more sophisticated method could involve incorporating the adjoint of the shot separation into the back projection process. The process applies equally to both acoustic and elastic inversion.

Since the separation procedure is applied to the simulated common multisource gather obtained via modeling with a finite-difference or finite-element code, in some embodiments, the source wavelets and delay times are adapted in order to enhance the separation procedure: for example, by choosing different time and frequency windowing for each source. In some embodiments, information from the full volume wavefield is used to enhance the separation procedure.

It is apparent from the above discussion that, in one aspect, the presently disclosed techniques include a computer-implemented method, such as the method 100 of FIG. 1. In another aspect, it includes a computing apparatus such as the computing apparatus 300 of FIG. 3, programmed to perform such a method. In still another aspect, it includes a program storage medium such as the optical disk 320, encoded with instructions that, when executed by a computing apparatus, perform a method such as the method 100. In another embodiment, a computing system with means to perform method 100 is provided. In another embodiment, an information processing apparatus for use in a computing system is provided, and includes means to perform method 100.

Some portions of the detailed descriptions herein are therefore presented in terms of a software-implemented process involving symbolic representations of operations on data bits within a memory in a computing system or a computing device. These descriptions and representations are the means used by those in the art to most effectively convey the substance of their work to others skilled in the art. The disclosed process and operations require physical manipulations of physical quantities. Usually, though not necessarily, these quantities take the form of electrical, magnetic, or optical signals or information capable of being stored, transferred, combined, compared, and otherwise manipulated. It has proven convenient at times, principally for reasons of common usage, to refer to these signals as data, bits, values, elements, symbols, characters, terms, numbers or the like.

It should be borne in mind, however, that all of these and similar terms are to be associated with the appropriate physical quantities and are merely convenient labels applied to these quantities. Unless specifically stated or otherwise as may be apparent, throughout the present disclosure, these descriptions refer to the action and processes of an electronic device that manipulates and transforms data represented as physical (electronic, magnetic, or optical) quantities within some electronic device's storage into other data similarly represented as physical quantities within the storage, or in transmission or display devices. Examples of the terms denoting such a description are, without limitation, the terms "processing," "computing," "calculating," "determining," "deriving," "displaying" and the like.

Note also that the software implemented aspects are typically encoded on some form of program storage medium or implemented over some type of transmission medium. The program storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber or some other suitable transmission medium known to the art. The technique is not limited by these aspects of any given implementation.

Furthermore, processing the data in accordance with the techniques disclosed herein will necessarily result in a physical transformation of the computing apparatus on which the data is processed. The data itself is physically manifested or embodied as a series of electromagnetic bits encoded on a program storage medium of some kind. The execution of the disclosed method will yield a set of processed data residing on the storage. In some embodiments, this will be an entirely new set of data whose creation leaves the original set of data intact while in others it may replace the original set of data. Either way, the data is physically manifested upon the storage medium as a set of electromagnetic bits. The processed data will therefore be physically manifested upon the storage medium and that physical manifestation will differ from what was present before processing either by addition or alteration. Thus, the execution of the method physically transforms the computing apparatus from its previous state prior to execution.

Figure 4A:
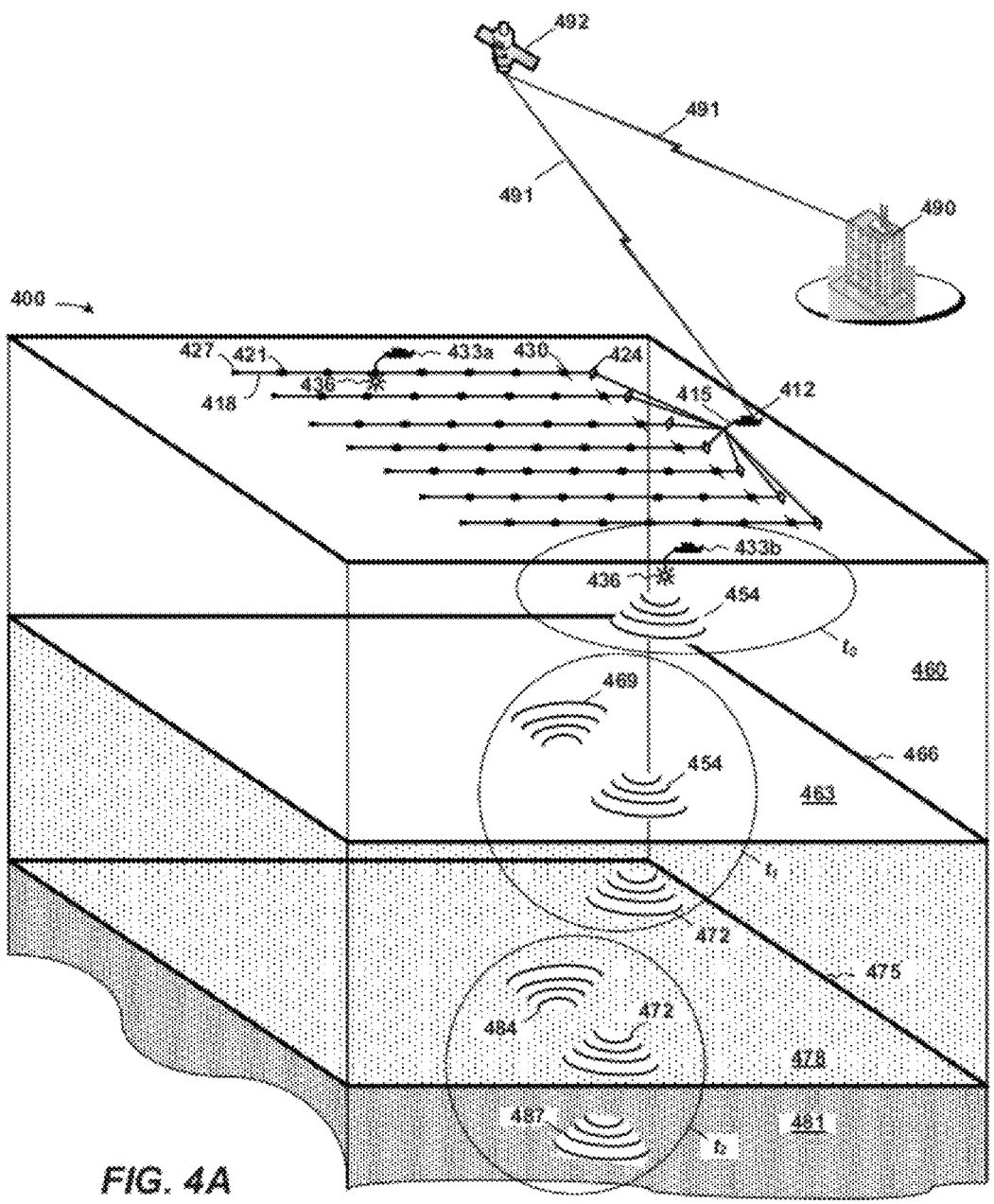
FIG. 4A-FIG. 4C conceptually depict a towed array, marine seismic survey by which seismic survey data may be acquired in one embodiment; transmission of the acquired seismic survey data to a data processing facility; and the computing system at the data processing facility by which the acquired seismic survey data may be processed in accordance with one particular embodiment.
Figure 4B:
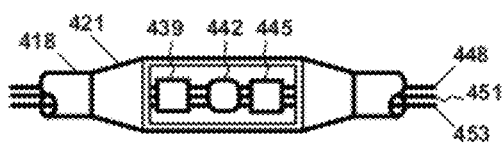

To further an understanding of various embodiments described herein, one particular embodiment manifesting several aspects thereof will now be presented. This particular embodiment acquires the seismic survey data from which the multiple CSGs are culled. Referring now to FIG. 4A-FIG. 4B, a towed array, marine seismic survey apparatus 400 is shown. FIG. 4A is a perspective view of the survey apparatus 400 as deployed and FIG. 4B is a partially cut-away, side view of an instrumented sonde of the survey apparatus 400.

A survey vessel 412 tows an array 415 of streamers 418 (only one indicated) comprised of a variety of seismic sensor sondes 421 (only one indicated). The instrumented sondes 421 house, in the illustrated embodiment, a pressure sensor 439, a particle motion sensor 442, and an orientation sensor 445, as is conceptually shown in FIG. 49. The pressure sensor 439, or "hydrophone," acquires the "pressure data" 427 indicating the magnitude and time of arrival for passing wavefronts. The particle motion sensor 442 measures not only the magnitude of passing wavefronts, but also their direction.

Note that the inclusion of the particle motion sensor 442 indicates that the data collected in this particular survey is what is known in the art as "multicomponent" data. As is discussed above, however, the presently disclosed techniques are not so limited.

The sensors of the instrumented sondes 421 then transmit data representative of the detected quantity over the electrical leads of the streamer 418. Referring now to FIG. 4A and FIG. 4B, the data generated by the sensors 400, 403, and 406 of the instrumented sondes 421 is transmitted over the streamer 418 to a computing apparatus (not shown) aboard the survey vessel 412.

The spacing, dimensions, and positioning of the array 415 may be implemented in accordance with conventional practice. For example, the illustrated embodiment employs seven streamers 418, each of which includes eight instrumented sondes 421. Those in the art having the benefit of this disclosure will appreciate that the number of streamers 418 and the number of sondes 421 will be highly implementation specific. Streamers 418, for instance, typically are several kilometers long, and so there are considerably greater numbers of sondes 421 in a typical towed array marine survey. These types of numbers are a significant contributing factor in the voluminous nature of the acquired seismic survey data set.

Returning now to FIG. 4A, pair of source vessels 433a-433b, each of which tows a respective seismic source 436 are also shown. Some embodiments of the presently disclosed techniques employ two seismic source signals generated from at least two different positions in order to obtain different polarization vectors. The characteristics of the sources (e.g., frequency content, strength, etc.) are designed in accordance with the simultaneous source, shot separation techniques described above. Alternative embodiments may use different numbers of sources 436 at different positions.

Seismic survey data collection from the starboard source 436 is illustrated in FIG. 4A. In some embodiments, the process used can be the same for the port source 436, which is performed simultaneously (or substantially simultaneously, or in synchronization) with the starboard side collection. However, the port side collection is omitted for the sake of clarity. FIG. 4A shows the process at three points in time, $t_0$, $t_1$ and $t_2$. Those in the art will appreciate that the survey apparatus 400 will be in motion and, unlike what is shown, its position relative to the acoustic signals and the geological formation will change over time.

At time $t_0$, the starboard source 436 is triggered and imparts a seismic signal 454 into the water column 460. At time $t_1$, the seismic signal 454 encounters a reflector 463, i.e., the interface between the water column 460 and the seabed 463. A portion 469 of the seismic signal 454 is reflected back to the survey apparatus 400 and a portion 472 continues propagating. The portion 472 encounters a second reflector 475, i.e., the interface between two layers 478, 481 in the seabed 463, at time $t_2$. A portion 484 is reflected back toward the survey apparatus 400 and a portion 487 continues to propagate. This continues until the propagating portions become too attenuated for reflection at detectable levels.

The reflected portions 469, 484, upon arrival at the survey apparatus 400, are detected by the pressure and particle motion sensors 439, 442. The detected reflections are digitized and transmitted to a data collection unit (not shown) aboard the survey vessel 412. The marine seismic survey is performed in accordance with conventional simultaneous source practice, typically for a period of days. This time period also contributes to the voluminous nature of the recorded seismic survey data set. The seismic survey data resulting from the survey is also digitized and transmitted to the data collection unit (not shown) aboard the survey vessel 412.

The acquired seismic survey data is then forwarded, in this particular embodiment, to a central processing facility 490 for processing (in some embodiments, the acquired seismic survey data may be processed on board vessel 412 or any other vessel associated with the seismic survey). The seismic survey data may be wirelessly transmitted over a satellite link 491 via a satellite 492. Alternatively, the seismic survey data may be encoded on some computer-readable medium—for example, an optical disk or a magnetic tape—and ported to the central processing facility 490. Upon arrival at the central processing facility 490, the seismic survey data is processed. In the first embodiment discussed above, all the software components and data resided on a single computing apparatus. Not only is this not required, it is unlikely to be the case. The type of processing contemplated in this case is usually performed on distributed computing systems offering superior computing resources than what might be available on a single computing apparatus.

Figure 4C:
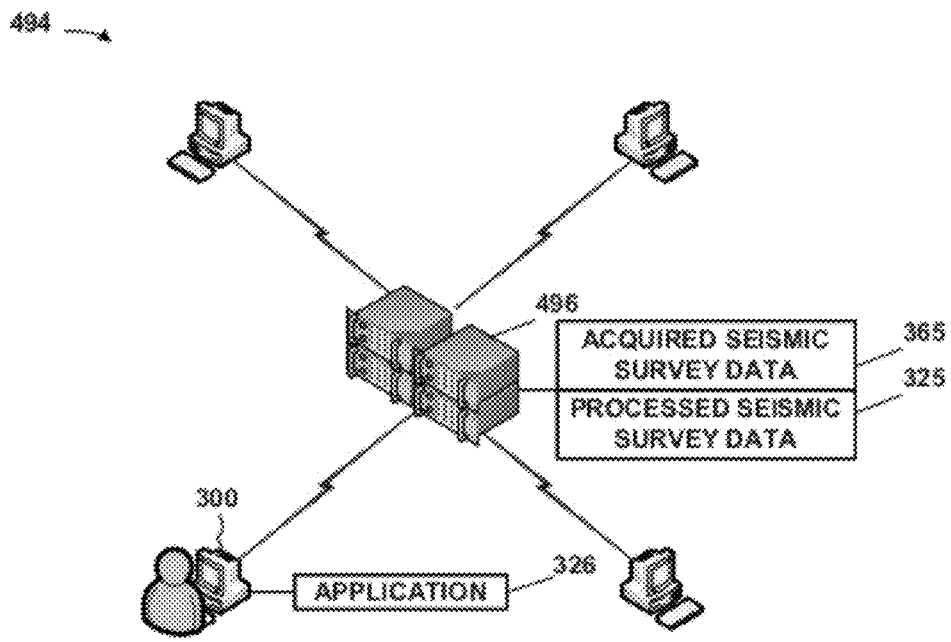

One such example computing system 494 is shown in FIG. 4C. There is no need for the acquired seismic survey data 365 to reside on the same computing apparatus 300 as the application 326 by which it is processed. Some embodiments may therefore be implemented on a distributed computing apparatus. Consider, e.g., the computing system 494 in FIG. 4C, comprising more than one computing apparatus. For example, the acquired seismic survey data 365 may reside in a data structure residing on a server 496 and the application 326 by which it is processed on a computing apparatus 300 used as a workstation.

The computing system 494 shown employs a networked client/server architecture. However, there is no requirement that the computing system 494 be networked. Alternative embodiments may employ, for instance, a peer-to-peer architecture or some hybrid of a peer-to-peer and a client/server architecture. The size and geographic scope of the computing system 494 is not material. The size and scope may range anywhere from just a few machines of a Local Area Network ("LAN") located in the same room to many hundreds or thousands of machines globally distributed in an enterprise computing system.

In the illustrated embodiment, the acquired seismic survey data 365 is processed at the processing center 490, shown in FIG. 4A to perform a multisource FWI in which the modeled wavefields are separated into CSGs and the separated CSGs are matched to the recorded data during inversion. The processing center 490 will typically house a distributed computing system such as the computing system 494 shown in FIG. 4C. Thus, a user 498 invokes the application 326 which then accesses the acquired seismic survey data 365 and processes it.

Figure 5A:
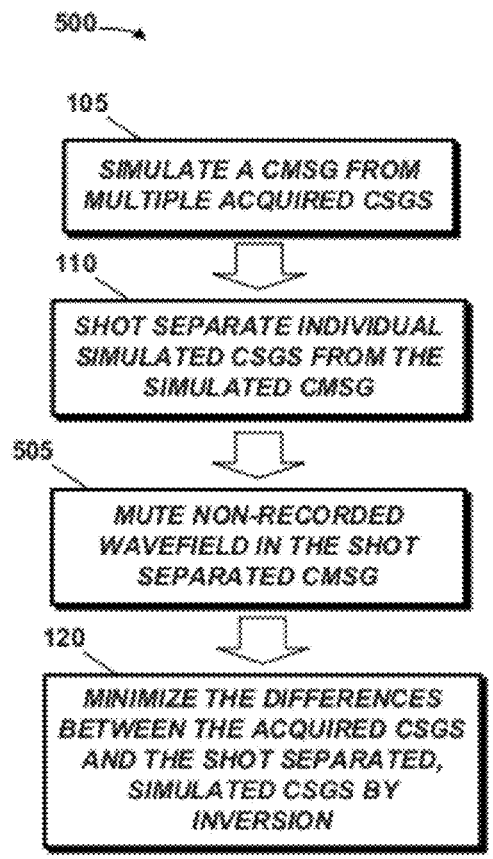
FIG. 5A-FIG. 5B illustrate an approach to multisource FWI in which the modeled wavefields are separated into CSGs and the separated CSGs are matched to the recorded data during inversion.
Figure 5B:
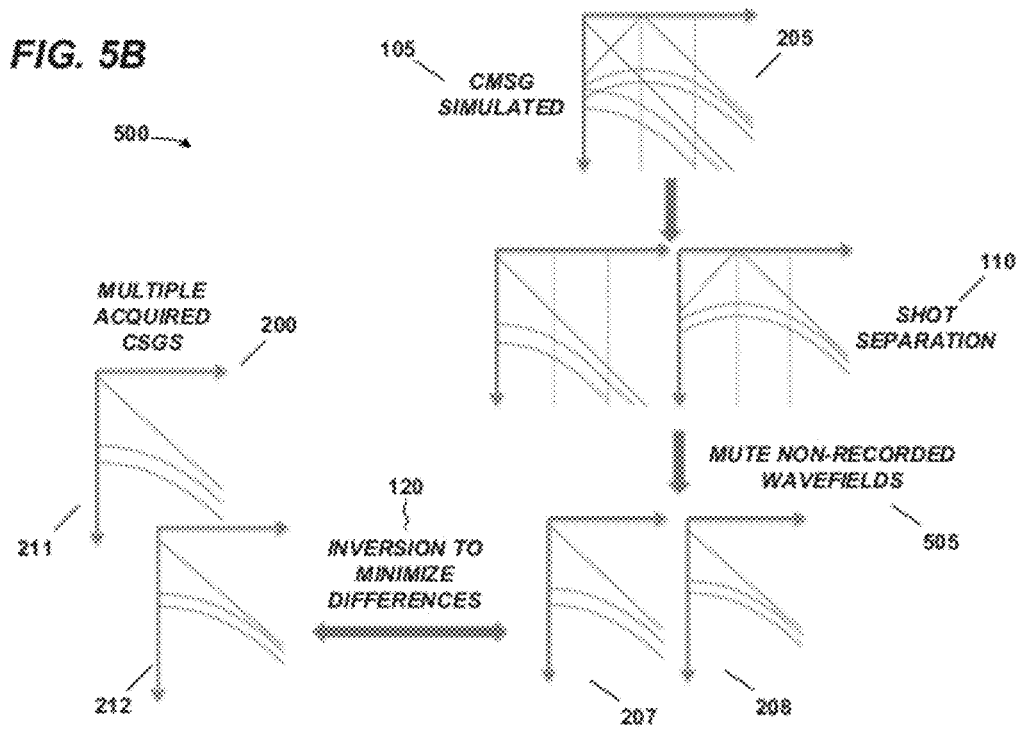

Referring now to FIG. 5A-FIG. 5B, one particular implementation of the method 100 in FIG. 1 is shown. The acquired seismic survey data 365 has been acquired as described above, the application 326 acquires (at 200) multiple common-shot gathers ("CSGs") 211, 212 from the acquired seismic survey data 365 in an area of interest. The multiple CSGs 211, 212 are then simulated (at 105) using a single run of a seismic modeling code to produce a common multisource gather ("CMSG") 205.

Individual simulated CSGs 297, 208 are then separated (at 110) from the CMSG. In this embodiment, the unmatched simulated seismic data are eliminated by muting (at 505) the non-recorded wavefields in the shot separated CMSG. The differences between the recorded CMSG and simulated CMSG, with non-recorded components 605 removed, are then minimized (at 120') by inversion.

Figure 6B:
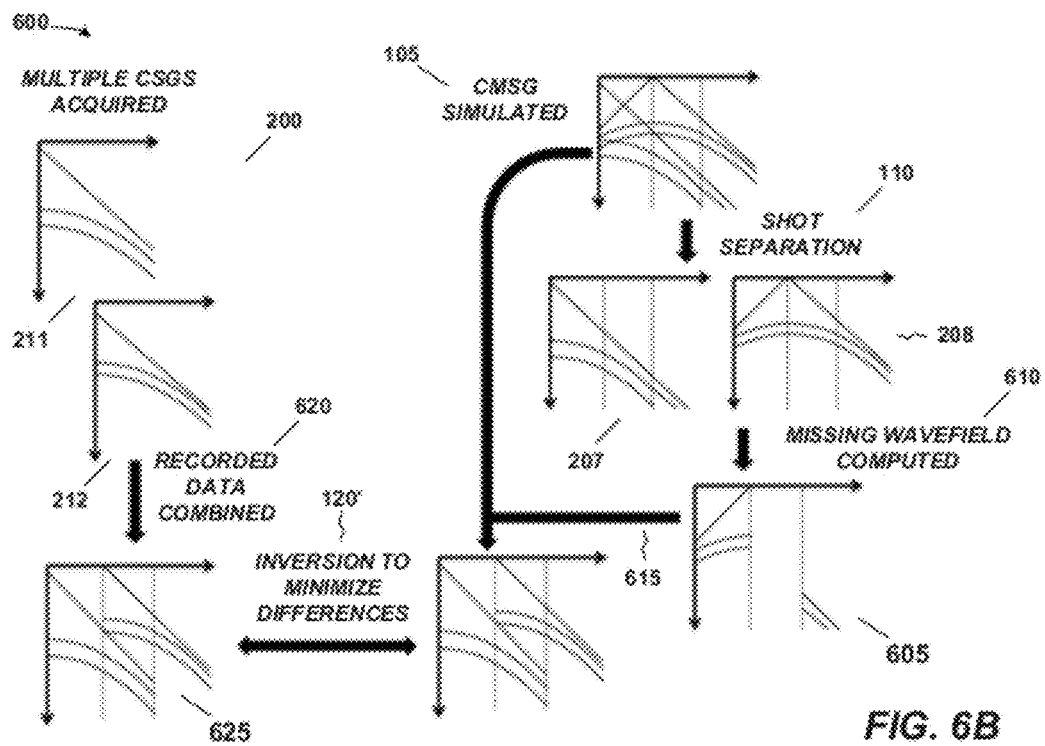

Turning now to FIG. 6A-FIG. 6B, a second implementation of the method 100 in FIG. 1 is shown as method 600, Again, the acquired seismic survey data 365 has been acquired as described above, the application 326 acquires (at 200) multiple common-shot gathers ("CSGs") 211, 212 from the acquired seismic survey data 365 in an area of interest. The multiple CSGs 211, 212 are then simulated (at 105) using a single run of a seismic modeling code to produce a common multisource gather ("CMSG") 205.

Individual simulated CSGs 297, 208 are then separated (at 110) from the CMSG. Components 605 of the simulated CMSG that do not correspond to recorded data are calculated (at 610). The components 605 of the simulated CMSG that do not correspond to recorded data are removed (at 615) from simulated CMSG. The recorded CSGs are combined (at 620) to produce a recorded. CMSG 625. The differences between the recorded. CMSG and simulated CMSG, with non-recorded components 605 removed, are then minimized (at 120') by inversion. The combination of recorded data is done in a way that is consistent with the way that the CMSGs are simulated—i.e., with the same choice of shots, and the same encoding as the simulated CMSG. Some local interpolation (or flex-binning) may also be required to colocate proximally recorded traces prior to combination.

The embodiments illustrated above use shot separation techniques to separate the simulated seismic data into two set—one that is matched in the acquired data and one that is not. Those in the art having the benefit of this disclosure will appreciate that the technique disclosed herein is not necessarily limited to shot separation. Other, alternative embodiments may use still other techniques known to the art for separating the simulated data into sets of data that are matched and unmatched in the acquired data.

Figure 7B:
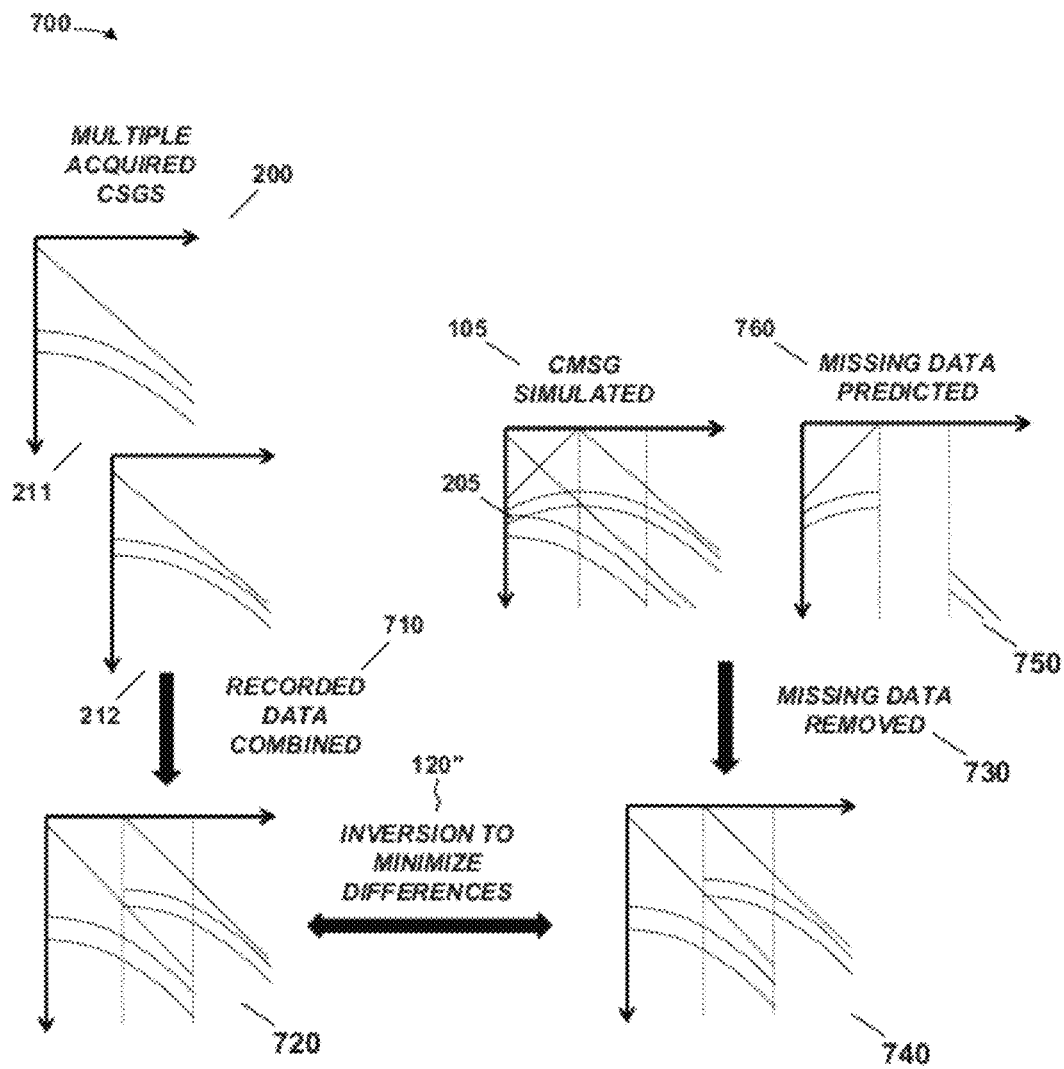

Accordingly, third approach 700 is illustrated in FIG. 7A-FIG. 7B. In this approach, the missing component is predicted and removed from the modeled wavefield before matching to the combined recorded CSG. The approach 700 begins (at 200), with the acquisition multiple common-shot gathers ("CSGs") 211, 212 from the acquired seismic survey data 365 (shown in FIG. 3) in an area of interest. As discussed above, this is non-fixed spread field data, for example, such as is acquired in a towed array marine survey.

The CSGs 211, 212 are then combined (at 710) to produce a recorded CMSG 720. Techniques for such a combination are known to the art and any such technique known to be suitable may be used. Those in the art having the benefit of this disclosure will appreciate that the recorded CMSG 720 is missing and/or otherwise lacks unrecorded data.

Meanwhile, multiple CSGs are simulated (at 105) to generate a simulated CMSG 205. This simulation is performed using full waveform modeling such as is known in the art. However, it cannot be matched to the recorded CMSG 720 because of the missing data in the CMSG 720.

The missing data 750 is therefore predicted (at 760). In this particular embodiment, the prediction is performed using a method that is less expensive than the full wave modeling (at 105) by which the simulated CMSG 205 is generated. Examples of such methods include, but are not limited to, plane wave modeling, f-x modeling, Radon modeling, etc. This prediction exploits incoherence of multiple shots in domains other than common shot—for example, common receiver, common midpoint, etc.—and utilizes information from geometry of acquisition (at 200).

The predicted, missing data 750 is then used to conform (at 730) the simulated CMSG 205 and the recorded CMSG 720 to one another. This may be done by either subtracting the missing data 750 from the simulated CMSG 205 or adding it to the recorded CMSG 720. In the illustrated embodiment, the missing data 750 is subtracted from the simulated CMSG 205 to yield the conformed simulated data 740.

An inversion is then performed (at 120") to minimize differences between the conformed, simulated CMSG 740 and the recorded CMSG 720. (Note that if the conformance (at 730) is performed by adding the predicted, missing data 750 to the recorded CMSG 720, then the inversion will be performed between a conformed, recorded CMSG and the simulated CMSG 205.) This minimization is with respect to both the simulated CMSG 205 and the recorded CMSG 720. The actual inversion may be performed using a suitable technique known to the art. The illustrated embodiment does so using an efficient variable-projection method.

One aspect of the method 700 is that one does not necessarily have to separate entire shots from the modeled data. One can instead just separate the data that is missing and/or unrecorded in the acquired record. This is advantageous in that it leads to an easier noise-removal problem.

The relation of the steps in the method 500 of FIG. 5A-FIG. 5B, the method 600 of FIG. 6A-FIG. 6B and the method 700 of FIG. 7A-FIG. 7B does not necessarily imply that all such steps must be executed in that precise order. As is expressly noted above, it is contemplated that some manipulations be performed in parallel. However, some embodiments may perform these steps sequentially if so desired. Those in the art having the benefit of this disclosure will furthermore appreciate that order in which some operations are performed may vary across alternative embodiments and implementations. Still further, they will appreciate that the operations disclosed may in some other embodiments be combined with still other operations without unduly mitigating the efficacy of the claimed method.

The following are incorporated by reference for their teachings regarding simultaneous acquisition as if set forth verbatim herein:

U.S. Pat. No. 5,924,049, entitled "Methods for acquiring and processing seismic data," issued Jul. 13, 1999, to Western Atlas International, Inc. as assignee of the inventor Craig J. Beasley;

U.S. application Ser. No. 12/174,310, entitled "Optimizing a Seismic Survey for Source Separation," and filed Jul. 16, 2008, in the name of the inventors Craig J. Beasley et al.;

U.S. application Ser. No. 12/165,185, entitled "Technique and System for Seismic Source Separation," and filed Jun. 30, 2008, in the name of the inventor Craig J. Beasley;

U.S. application Ser. No. 11/964,402, entitled "Separating Seismic Signals Produced by Interfering Seismic Sources," and filed Dec. 26, 2007, in the name of the inventor Ian Moore et al.;

U.S. application Ser. No. 12/247,284, entitled "Dithered Slip Sweep Vibroseis Acquisition System and Technique," and filed Oct. 8, 2008, in the name of the inventors Claudio Bagaini and Ian Moore;

U.S. application Ser. No. 12/256,135, entitled "Removing Seismic Interference Using Simultaneous or Near Simultaneous Source Separation," and filed Oct. 22, 2008, in the name of the inventor Ian Moore;

U.S. application Ser. No. 12/429,328, entitled "Separating Seismic Signals Produced by Interfering Seismic Sources," and filed Apr. 24, 2009, in the name of the inventors Ian Moore et al.;

P. Akerberg et al., "Simultaneous Source Separation by Sparse Radon Transform," *SEG Expanded Abstracts* (2008);

C. J. Beasley et al., "A New Look at Simultaneous Sources," *SEG Expanded Abstracts* (1998);

I. Moore, "Simultaneous source separation using dithered sources," *SEG Expanded Abstracts* (2008); and S. Spitz et al., 2008, "Simultaneous source separation: A prediction-subtraction approach," *SEG Expanded Abstracts* (2008).

The particular embodiments disclosed above are illustrative only, as the disclosed technique may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within its scope. Accordingly, the protection sought herein is as set forth in the claims below.

We claim:

1. A computer-implemented method for use in processing seismic data for indications of hydrocarbon deposits, the method comprising:
    receiving acquired seismic data as a plurality of common shot gathers for a subterranean geologic formation;
    simulating seismic data that represents a common multi-source gather for the subterranean geologic formation that correspond to a plurality of shots;
    for shot separated simulated seismic data, eliminating the simulated seismic data that are unmatched in the acquired seismic data to generated conformed simulated seismic data;
    performing, via a processor, a waveform inversion between the acquired seismic data and the conformed simulated seismic data; and
    based at least in part on the waveform inversion, estimating seismic velocities that indicate hydrocarbon deposits in the subterranean geologic formation.

2. The computer-implemented method of claim 1, comprising separating the simulated seismic data by predicting the data unmatched in the acquired seismic data.

3. The computer-implemented method of claim 2, wherein predicting the data unmatched in the acquired seismic data comprises plane wave modeling, f-x modeling, or Radon modeling.

4. The computer-implemented method of claim 2, wherein predicting the data unmatched in the acquired seismic data comprises exploiting incoherence of multiple shots in domains other than common shot.

5. The computer-implemented method of claim 2, wherein predicting the data unmatched in the acquired seismic data comprises utilizing information from a geometry of the recorded data.

6. The computer-implemented method of claim 1, comprising separating the simulated seismic data into the data matched in the acquired seismic data and the data unmatched in the acquired seismic data.

7. The computer-implemented method of claim 1, wherein: the eliminating comprises identifying one or more wavefields, that are in the acquired seismic data and not in the simulated seismic data, as one or more non-recorded wavefields of the simulated seismic data and muting the one or more non-recorded wavefields in the simulated seismic data to generate the conformed simulated seismic data.

8. The computer-implemented method of claim 1, comprising:
    computing one or more missing wavefields.

9. The computer-implemented method of claim 8, further comprising:
    combining the plurality of the common shot gathers of the acquired seismic data; and
    performing the waveform inversion between the combined common shot gathers and the simulated seismic data from which the components corresponding to the one or more missing wavefield have been removed.

10. The computer-implemented method of claim 9, wherein combining the common shot gathers of the acquired seismic data comprises combining the common shot gathers using: a same choice of shots as in the simulated data, a same encoding as the simulated data, local interpolation to colocate proximally recorded traces prior to combination, flex-binning, or combinations thereof.

11. A computing apparatus, comprising:
    a computing device;
    a storage accessible by the computing device;
    a software component residing on the storage that, when invoked by the computing device, performs a method for use in processing seismic data for indications of hydrocarbon deposits, the method comprising:
        receiving acquired seismic data as a plurality of common shot gathers for a subterranean geologic formation;
        simulating seismic data that represents a common multisource gather for the subterranean geologic formation that correspond to a plurality of shots;
        for shot separated simulated seismic data, eliminating the simulated seismic data that are unmatched in the acquired seismic data to generated conformed simulated seismic;
        performing a waveform inversion between the acquired seismic data and the conformed simulated seismic data; and
        based at least in part on the waveform inversion, estimating seismic velocities that indicate hydrocarbon deposits in the subterranean geologic formation.

12. The computing apparatus of claim 11, comprising separating the simulated seismic data into a plurality of data sets by shot separating the simulated seismic data.

13. The computing apparatus of claim 11, wherein:
    eliminating the data unmatched in the acquired seismic data from the simulated seismic data comprises identifying one or more wavefields, that are in the acquired seismic data and not in the simulated seismic data, as one or more non-recorded wavefields of the simulated seismic data and muting the one or more non-recorded wavefields in the simulated seismic data to generate the conformed simulated seismic data.

14. The computing apparatus of claim 11, wherein eliminating the data unmatched in the acquired seismic data from the simulated seismic data comprises:
    computing a missing wavefield; and
    removing components corresponding to the missing wavefield from the simulated seismic data.

15. A computer-implemented method for use in processing seismic data for indications of hydrocarbon deposits, the method comprising:
    receiving acquired seismic data as a plurality of common shot gathers for a subterranean geologic formation;

simulating seismic data that represents a common multi-source gather for the subterranean geologic formation that correspond to a plurality of shots;

for shot separated simulated seismic data, identifying a portion of the simulated seismic data as data unmatched in the acquired seismic data;

adding the data unmatched in the acquired seismic data to the acquired seismic data;

performing, via a processor, a waveform inversion between the simulated seismic data and the acquired seismic data after adding the data unmatched in the acquired seismic data to the acquired seismic data; and based at least in part on the waveform inversion, estimating seismic velocities that indicate hydrocarbon deposits in the subterranean geologic formation.

16. The computer-implemented method of claim 15, wherein the identifying comprises predicting the data unmatched in the acquired seismic data via plane wave modeling, f-x modeling, or Radon modeling.

17. The computer-implemented method of claim 15, wherein the identifying comprises predicting the data unmatched in the acquired seismic data via exploiting incoherence of multiple shots in domains other than common shot.

18. A computer-implemented method for use in processing seismic data for indications of hydrocarbon deposits, the method comprising:

receiving acquired seismic data as a plurality of common shot gathers for a subterranean geologic formation;

simulating seismic data that represents a common multi-source gather for the subterranean geologic formation that correspond to a plurality of shots;

for shot separated simulated seismic data, identifying a portion of the simulated seismic data as data unmatched in the acquired seismic data;

subtracting the data unmatched in the acquired seismic data from the simulated seismic data;

performing, via a processor, a waveform inversion between the simulated seismic data and the acquired seismic data after adding the data unmatched in the acquired seismic data to the acquired seismic data; and based at least in part on the waveform inversion, estimating seismic velocities that indicate hydrocarbon deposits in the subterranean geologic formation.

19. The computer-implemented method of claim 18, wherein the identifying comprises predicting the data unmatched in the acquired seismic data via plane wave modeling, f-x modeling, or Radon modeling.

20. The computer-implemented method of claim 18, wherein the identifying comprises predicting the data unmatched in the acquired seismic data via exploiting incoherence of multiple shots in domains other than common shot.

21. The computer-implemented method of claim 1 wherein the simulating comprises facilitating shot separation of the simulated seismic data via at least one member selected from a group consisting of choosing one or more criteria, encoding amplitude and encoding time-series; and comprising separating the simulated seismic data to generate the shot separated simulated seismic data based at least in part on at least one of the at least one selected member.

22. The computer-implemented method of claim 1 wherein the waveform inversion comprises full-waveform inversion.

23. The computer-implemented method of claim 1 wherein the simulating comprises facilitating shot separation of the simulated seismic data via encoding and wherein the waveform inversion comprises full-waveform inversion.

* * * * *